(12) United States Patent
Tan

(10) Patent No.: US 11,892,947 B2
(45) Date of Patent: Feb. 6, 2024

(54) LOADING LOGICAL TO PHYSICAL MAPPING TABLE TO CACHE OF MEMORY CONTROLLER

(71) Applicant: YANGTZE MEMORY TECHNOLOGIES CO., LTD., Wuhan (CN)

(72) Inventor: Hua Tan, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 108 days.

(21) Appl. No.: 17/719,118

(22) Filed: Apr. 12, 2022

(65) Prior Publication Data

US 2023/0062729 A1  Mar. 2, 2023

Related U.S. Application Data

(63) Continuation of application No. PCT/CN2021/115706, filed on Aug. 31, 2021.

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

2005/0138265 A1* 6/2005 Nguyen ............... G11B 27/105

* cited by examiner

*Primary Examiner* — Jae U Yu
(74) *Attorney, Agent, or Firm* — BAYES PLLC

(57) ABSTRACT

A data operation method of a memory system is provided. The method includes, based on an obtained logical to physical mapping table, determining whether address values of a plurality of target physical addresses in the logical to physical mapping table corresponding to a plurality of target logical addresses are continuous; if so, selecting one of the plurality of target physical addresses as a base physical address, and setting a base physical address offset based on address values of remaining target physical addresses; and storing the base physical address and the base physical address offset into a cache of a memory controller, as a mapping relationship of the plurality of target logical addresses corresponding to the plurality of target physical addresses.

20 Claims, 7 Drawing Sheets

LOADING LOGICAL TO PHYSICAL MAPPING TABLE TO CACHE OF MEMORY CONTROLLER

CROSS-REFERENCES TO RELATED APPLICATIONS

This application is a continuation of International Application No. PCT/CN2021/115706, entitled "Loading Logical to Physical Mapping Table to Cache of Memory Controller," filed on Aug. 31, 2021, which is incorporated herein by reference in its entirety.

TECHNICAL FIELD

The present disclosure relates to the field of memory technology, and in particular, to a method for loading a logical to physical mapping table to cache of the memory controller, a data operation method of a memory system, a memory controller, and a memory system.

BACKGROUND

Random Read (RR) performance is essential to solid-state drives (SSD) used in personal computers and their servers, and to universal flash storage (UFS) used in mobile phones and various embedded systems.

RR generally includes two steps: the memory controller queries the physical address (PA) of the user data requested by the host in the memory storage cell array based on the corresponding logical address (LA) of the user data, and the logical to physical mapping table (L2P table); and then, the memory controller reads out the user data from the storage cell array based on the physical address and sends it to the host.

Generally, the logical to physical mapping table is stored in the RAM (Random Access Memory) of the memory controller, which includes static random access memory (SRAM) and dynamic random access memory access memory (DRAM). However, the logical to physical mapping table will occupy a larger memory of the memory controller when stored on the RAM of the memory controller, due to the continuous increase of the address space (i.e., memory space) of the memory device, which in turn affects the performance of the random read and the performance of the memory.

SUMMARY

In one aspect, the present disclosure provides a method of loading a logical to physical mapping table into a cache of a memory controller, includes: based on a currently obtained logical to physical mapping table, determining whether address values of a plurality of target physical addresses in the logical to physical mapping table corresponding to a plurality of target logical addresses are continuous; if so, selecting one of the plurality of target physical addresses as a base physical address, and setting a base physical address offset based on address values of remaining target physical addresses; storing the base physical address and the base physical address offset into the cache, as a mapping relationship of the plurality of target logical addresses corresponding to the plurality of target physical addresses.

The method according to an embodiment of the present disclosure, wherein the method specifically includes: storing the base physical address and the base physical address offset into a first cache region of the cache, as the mapping relationship of the plurality of target logical addresses corresponding to the plurality of target physical addresses; and if not so, storing the mapping relationship between the plurality of target logical addresses and the plurality of target physical addresses into a second cache region of the cache.

The method according to an embodiment of the present disclosure, wherein the base physical address is the first or last one of the plurality of target physical addresses.

The method according to an embodiment of the present disclosure, wherein amount of the base physical address offset corresponds to number of target physical addresses with continuous address values.

The method according to an embodiment of the present disclosure, wherein the logical to physical mapping table includes a plurality of sub-mapping tables, each of the sub-mapping tables includes a plurality of segments, and each of the segments stored with a plurality of physical addresses, wherein the plurality of target logical addresses correspond to at least one of the segments.

The method according to an embodiment of the present disclosure, wherein when the plurality of target logical addresses correspond to a plurality of the segments, the step of based on the currently obtained logical to physical mapping table, determining whether address values of the plurality of target physical addresses in the logical to physical mapping table corresponding to the plurality of target logical addresses are continuous specifically includes: based on the currently obtained logical to physical mapping table, determining whether the address values of the plurality of target physical addresses in each segment of the logical to physical mapping table corresponding to the plurality of target logical addresses are continuous.

The method according to an embodiment of the present disclosure, wherein the step of selecting one of the plurality of target physical addresses as the base physical address, and setting the base physical address offset based on address values of the remaining target physical addresses specifically includes: when the address values of the plurality of target physical addresses in one of the segments of the logical to physical mapping table corresponding to the plurality of target logical addresses are continuous, making one target physical address in the one of the segments as the base physical address, and setting the base physical address offset based on the address values of the remaining target physical addresses in the one of the segments.

The method according to an embodiment of the present disclosure, wherein whether the address values of the plurality of target physical addresses in the logical to physical mapping table corresponding to the plurality of target logical addresses are continuous is determined by an acceleration determining circuit.

In another aspect, the present disclosure further provides a data operation method of memory system, including: obtaining a logical to physical mapping table in response to a data request instruction; based on a currently obtained logical to physical mapping table, determining whether address values of a plurality of target physical addresses in the logical to physical mapping table corresponding to a plurality of target logical addresses are continuous; if so, selecting one of the plurality of target physical addresses as a base physical address, and setting a base physical address offset based on address values of remaining target physical addresses; storing the base physical address and the base physical address offset into a cache of a memory controller, as a mapping relationship of the plurality of target logical addresses corresponding to the plurality of target physical addresses; reading corresponding data from memory devices based on the mapping relationship loaded by the cache.

In yet another aspect, the present disclosure further provides a memory controller, including: a processing unit; a cache set corresponding to the processing unit; an acceleration determining circuit configured to: based on an obtained logical to physical mapping table, determine whether address values of a plurality of target physical addresses in the logical to physical mapping table corresponding to a plurality of target logical addresses are continuous; wherein the processing unit is configured to: obtain, from the acceleration determining circuit, a first instruction indicating that the address values of the plurality of target physical addresses are determined to be continuous; based on the first instruction, select one of the plurality of target physical addresses as a base physical address, and set a base physical address offset based on address values of remaining target physical addresses; and store the base physical address and the base physical address offset into the cache, as a mapping relationship of the plurality of target logical addresses corresponding to the plurality of target physical addresses.

The memory controller according to an embodiment of the present disclosure, wherein the acceleration determining circuit is implemented by adders in the form of hardware.

The memory controller according to an embodiment of the present disclosure, wherein the memory controller is adapted to a sequential write operation mode.

The memory controller according to an embodiment of the present disclosure, wherein the cache is a static random access memory.

In yet another aspect, the present disclosure further provides a memory system, including: one or more memory devices; the memory controller of any of the preceding paragraphs, wherein the memory controller is coupled to the memory devices.

The memory system according to an embodiment of the present disclosure, wherein the memory devices include a three-dimensional NAND flash memory.

BRIEF DESCRIPTION OF THE DRAWINGS

In order to explain the technical solution of the present disclosure more clearly, the accompanying drawings needed in the description of the various embodiments according to the present disclosure will be briefly introduced as below. Obviously, the drawings in the following description are only some embodiments of the present disclosure. For those skilled in the art, other drawings can be obtained based on these drawings without creative work.

DETAILED DESCRIPTION

Figure 1:
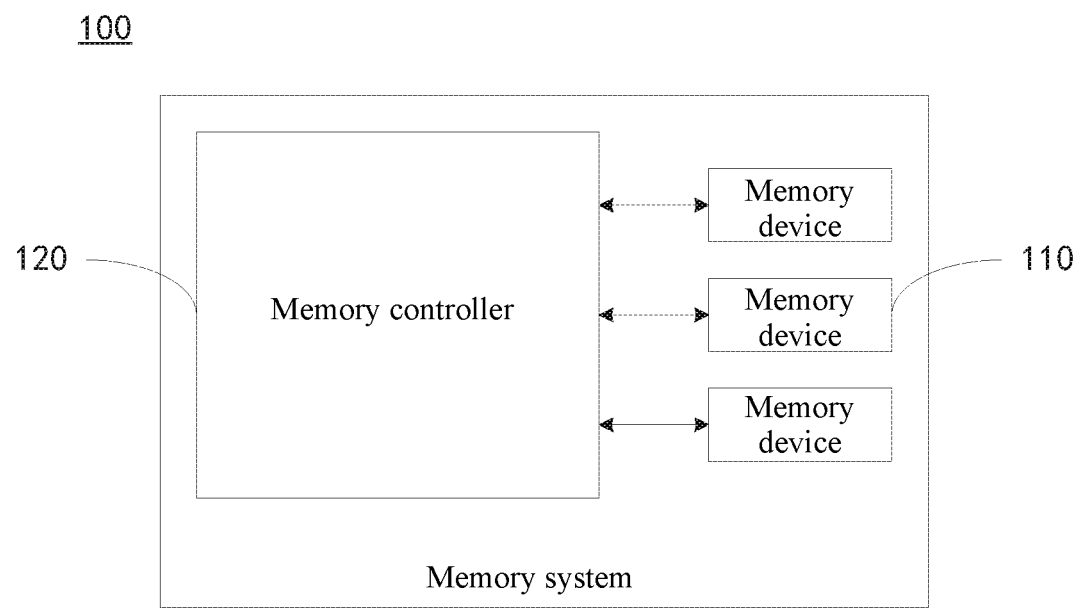
FIG. 1 shows a schematic structural diagram of a memory system provided according to an embodiment of the present disclosure.

The technical solutions in the embodiments of the present disclosure will be clearly described below in conjunction with the drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative work shall fall within the scope protected by the embodiments of the present disclosure.

In the description of the embodiments of the present disclosure, it should be understood that the terms, such as "center," "longitudinal," "transverse," "length," "width," "thickness," "upper," "lower," "front," "back," "left," "right," "vertical," "horizontal," "top," "bottom," "inner," "outer," "clockwise," "counterclockwise," and so on, refer the orientation or positional relationship based on those shown in the drawings, and is only for the convenience of describing the embodiments of the present disclosure and simplifying the description, rather than indicating or implying that the device or element referred to must have the specific orientation, or be constructed and operated in a specific orientation, and therefore, it cannot be understood as a limitation to the embodiments of the present disclosure. In addition, the terms "first" and "second" are only used for descriptive purposes, and should not be understood as indicating or implying relative importance or implicitly indicating the number of indicated technical features. Therefore, the features defined with "first" and "second" may explicitly or implicitly include one or more of the features. In the description of the embodiments of the present disclosure, "a plurality of" means two or more than two, unless specifically defined otherwise.

In the description of the embodiments of the present disclosure, it should be noted that the terms "installed," "connected with," and "connected to" should be understood in a broad sense unless otherwise clearly specified and limited. For example, they can be fixed connected or detachably connected, or integrally connected; they can be mechanically connected, or can be electrically connected or communicate with each other; they can be directly connected or indirectly connected through an intermediate medium, or can be the internal connection of two elements or the interaction relationship of two elements. For those of ordinary skill in the art, the specific meanings of the above-mentioned terms in the embodiments of the present disclosure can be understood according to specific situations.

The following disclosure provides many different implementations or examples for realizing different structures of the embodiments of the present disclosure. In order to simplify the disclosure of the embodiments of the present disclosure, the components and settings of specific examples are described below. Of course, they are only examples, and are not intended to limit the embodiments of the present disclosure. In addition, the embodiments of the present disclosure may repeat the reference numerals and/or reference letters in different examples, such repeating is for the purpose of simplification and clarity, and does not indicate the relationship between the various implementations and/or settings as discussed itself. The embodiments of the present disclosure can solve the problem that the existing logical to physical mapping table (hereinafter referred to as the "L2P table") occupies a larger cache space of the memory controller.

Refer to FIG. 1, which shows a schematic structural diagram of a memory system 100 provided according to an embodiment of the present disclosure. As shown in FIG. 1, the memory system 100 includes one or more memory devices 110, and a memory controller 120 coupled with the memory devices 110.

Specifically, the memory devices 110 may include one or more memory dies, and each memory die includes a memory array and corresponding peripheral circuits; the memory dies may specifically be, but are not limited to, flash memory, such as three-dimensional (3D) NAND flash memory device. Corresponding firmware such as Flash Translation Layer (FTL) is configured in the memory controller 120, and the firmware may run in the memory controller 120, so as to realize functions or operations such as, reading, writing, erasing, etc., as well as to implement the method of loading the logical to physical mapping table to the cache of the memory controller and the data operation method of the memory system of the embodiments below. The memory controller 120 may specifically include a front-end interface device, a back-end interface device, and one or more processing units (such as CPU cores, etc.). The front-end interface device is configured with plurality of channels to interactively communicate with the host 300 based on protocols such as PCIe. The back-end interface device is configured with plurality of channels to interactively communicate with respective memory devices 110 respectively, based on, for example, the Onfi protocol.

Figure 2:
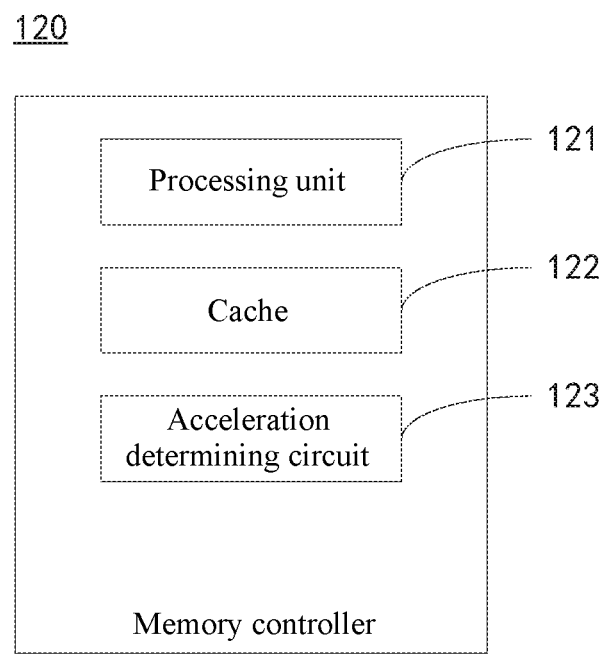
FIG. 2 shows a schematic structural diagram of a memory controller provided according to an embodiment of the present disclosure.

Refer further to FIG. 2, which shows a schematic structural diagram of a memory controller 120 provided according to an embodiment of the present disclosure. As shown in FIG. 2, the memory controller 120 includes a processing unit 121, a cache 122 provided corresponding to the processing unit 121, and an acceleration determining circuit 123.

The acceleration determining circuit 123 is configured to be able to perform the step of "based on the obtained logical to physical mapping table, determining whether the address values of the plurality of target physical addresses in the logical to physical mapping table corresponding to the plurality of target logical addresses are continuous" described below. In particularly, the acceleration determining circuit 123 may implement the operation of this step by adders in the form of hardware circuit. It should be noted that the determining of whether continuous or not is relatively easy to be implemented by hardware circuit (i.e., the acceleration determining circuit 123), wherein the speed and efficiency are very fast, and it will not bring additional burden to the memory controller 120, and the occupied area is also very small, compared with implementing the determining for continuous by the memory controller 120 running the corresponding firmware.

The processing unit 121 implements the following steps described below by executing corresponding firmware: obtaining from the acceleration determining circuit 123 a first instruction indicating that the address values of a plurality of target physical addresses are determined to be continuous; based on the first instruction, selecting one of the plurality of target physical addresses as the base physical address, and setting a base physical address offset based on the address values of remaining target physical addresses; and storing the base physical address and the base physical address offset in the cache 122, as a mapping relationship of the plurality of target logical addresses corresponding to the plurality of target physical addresses.

Specifically, the cache 122 is a static random access memory (SRAM).

In an embodiment, the memory controller 120 may be adapted to a sequential write operation mode. It should be noted that the address values of the physical addresses (PA) of the data in the memory devices 110 are basically continuous when the data is stored in the memory devices 110 by the memory controller 120 through the sequential write operation mode. In such a way, a larger proportion of the address values of the target physical addresses are continuous, which can better achieve the effects of the embodiments of the present disclosure, for example, the good compression effect and the reduced cache space occupied.

Figure 3:
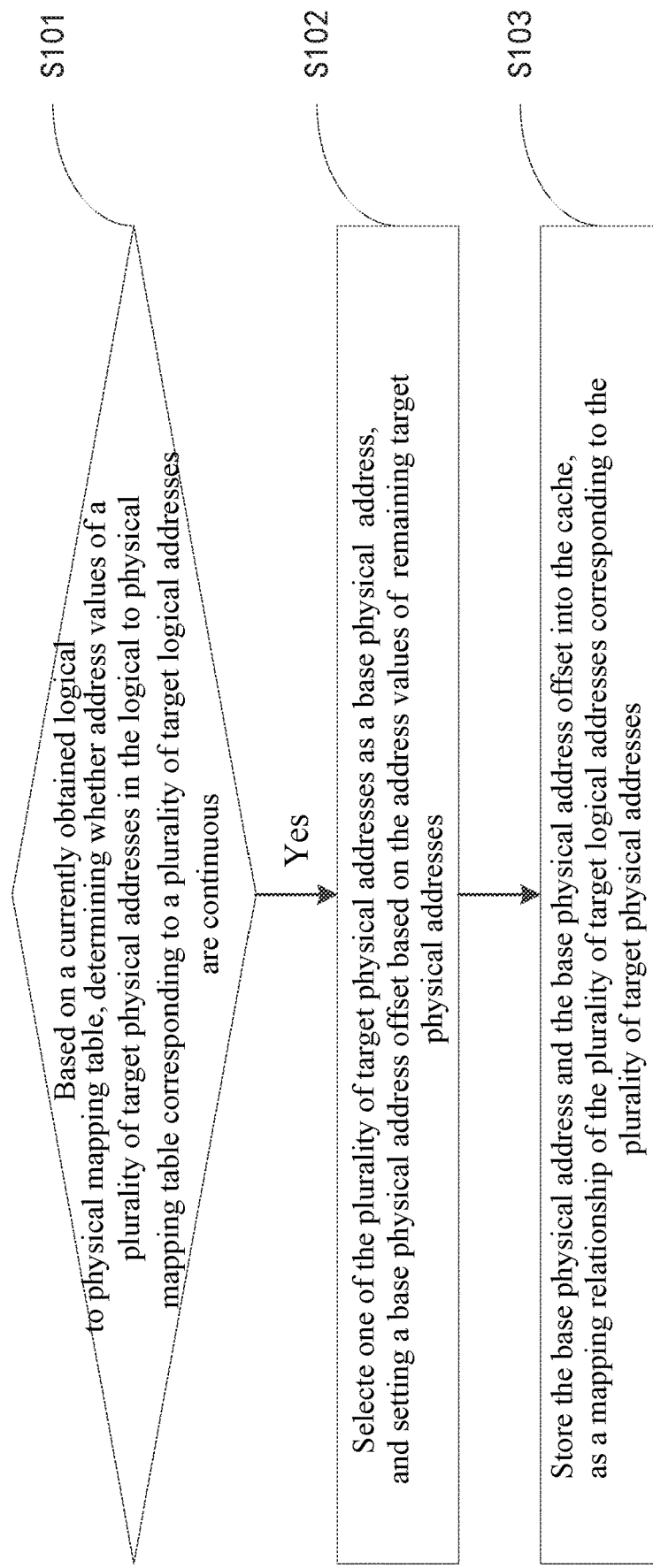
FIG. 3 shows a schematic flowchart of a method for loading a logical to physical mapping table to a cache of a memory controller provided according to an embodiment of the present disclosure.

Refer to FIG. 3, which shows a schematic flowchart of a method for loading a logical to physical mapping table to a cache of a memory controller provided according to an embodiment of the present disclosure. As shown in FIG. 3, the specific flows of the method may be as follows: determining step S101: based on a currently obtained logical to physical mapping table, determining whether address values of a plurality of target physical addresses in the logical to physical mapping table corresponding to a plurality of target logical addresses are continuous; setting step S102: if so, selecting one of the plurality of target physical addresses as a base physical address, and setting a base physical address offset based on the address values of remaining target physical addresses; compressively storing step S103: storing the base physical address and the base physical address offset in the cache, as a mapping relationship of the plurality of target logical addresses corresponding to the plurality of target physical addresses.

It is understood that the above determining step S101 can be executed by the acceleration determining circuit 123 described above. In this step, when the acceleration determining circuit 123 of the memory controller 120 determines the address values of the plurality of target physical addresses corresponding to the plurality of target logical addresses are continuous, the acceleration determining circuit 123 generates a first instruction indicating that the address values of the plurality of target physical addresses are determined to be continuous.

Further, when the processing unit 121 of the memory controller 120 obtains the first instruction from the acceleration determining circuit 123, the processing unit 121 performs the above setting step S102 and compressively storing step S103 based on the first instruction.

It should be noted that the physical addresses of the data stored in the sequential write operation mode are basically continuous. Therefore, when the mapping relationship between the plurality of target logical addresses to which target data corresponds and the plurality of target physical addresses needs to be stored in the cache 122 of the memory controller 120, only the base physical address of the plurality of target physical addresses and the base physical address offset set according to the remaining target physical addresses need to be stored in the cache 122. Then, the address values of all target physical addresses can be derived based on the base physical address and the base physical address offset.

Figure 5A:
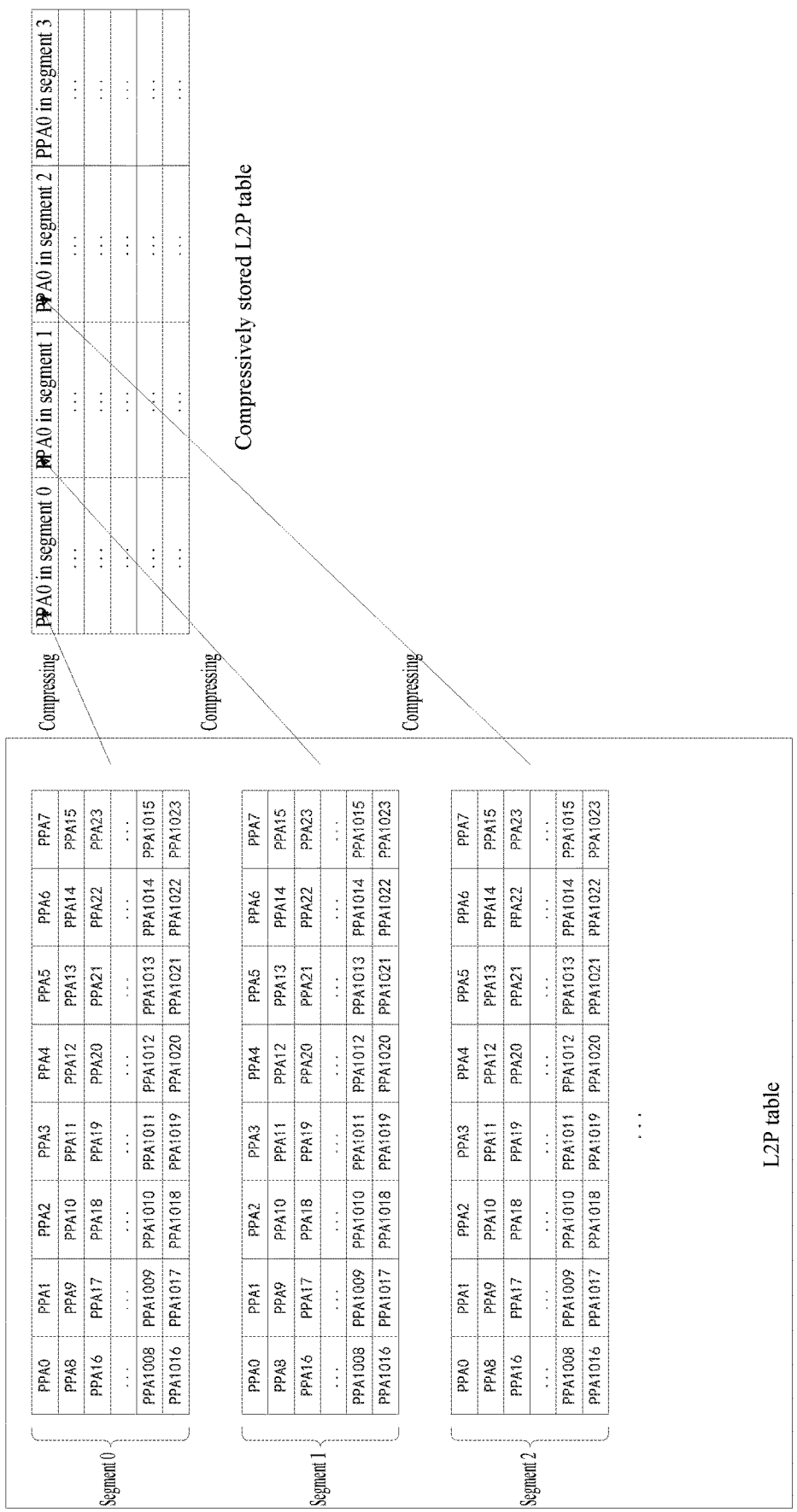
FIGS. 5a to 5c show schematic diagrams of application scenarios of a method for loading a logical to physical mapping table to a cache of a memory controller provided according to an embodiment of the present disclosure.

It is understood that in this way of compressively storing, the space of the cache 122 of the memory controller 120 occupied by the mapping relationship between the logical addresses to which the target data corresponds and the physical addresses can be effectively reduced. For example, if the number of target physical addresses is 1024 and continuous, one target physical address will occupy 4 Byte memory, in the way without compressively storing, these 1024 target physical addresses will occupy 1024*4 Byte=4 KB memory, while in the way with compressively storing, 1024 target physical addresses are replaced by the base physical address and the base physical address offset, which will only occupy 4 Byte memory, for example, and the compression ratio can reach 1024, as shown in FIG. 5a. The physical address may specifically be a physical page address (PPA).

Specifically, the base physical address may be the first or last one of the plurality of target physical addresses, and the amount of base physical address offset corresponds to the number of target physical addresses with continuous address values. For example, if there are a total of 8 target physical addresses and their address values are continuous in sequence, in the case that the base physical address is the first one, the offset of the remaining target physical addresses relative to the base physical address is +7; in the case that the base physical address is the eighth one, the offset of the remaining target physical addresses relative to the base physical address is −7.

It will be understood that the choosing of the base physical address is not restrictive. One of the continuous target physical addresses may be chosen as the base physical address, and the amount of base physical address offset may also be varied accordingly. For example, if there are a total of 8 target physical addresses and their address values are continuous in sequence, the third one may be chosen as the base physical address, and the base physical address offset of the remaining target physical addresses relative to the base physical address is −2 and +5.

Figure 5B:
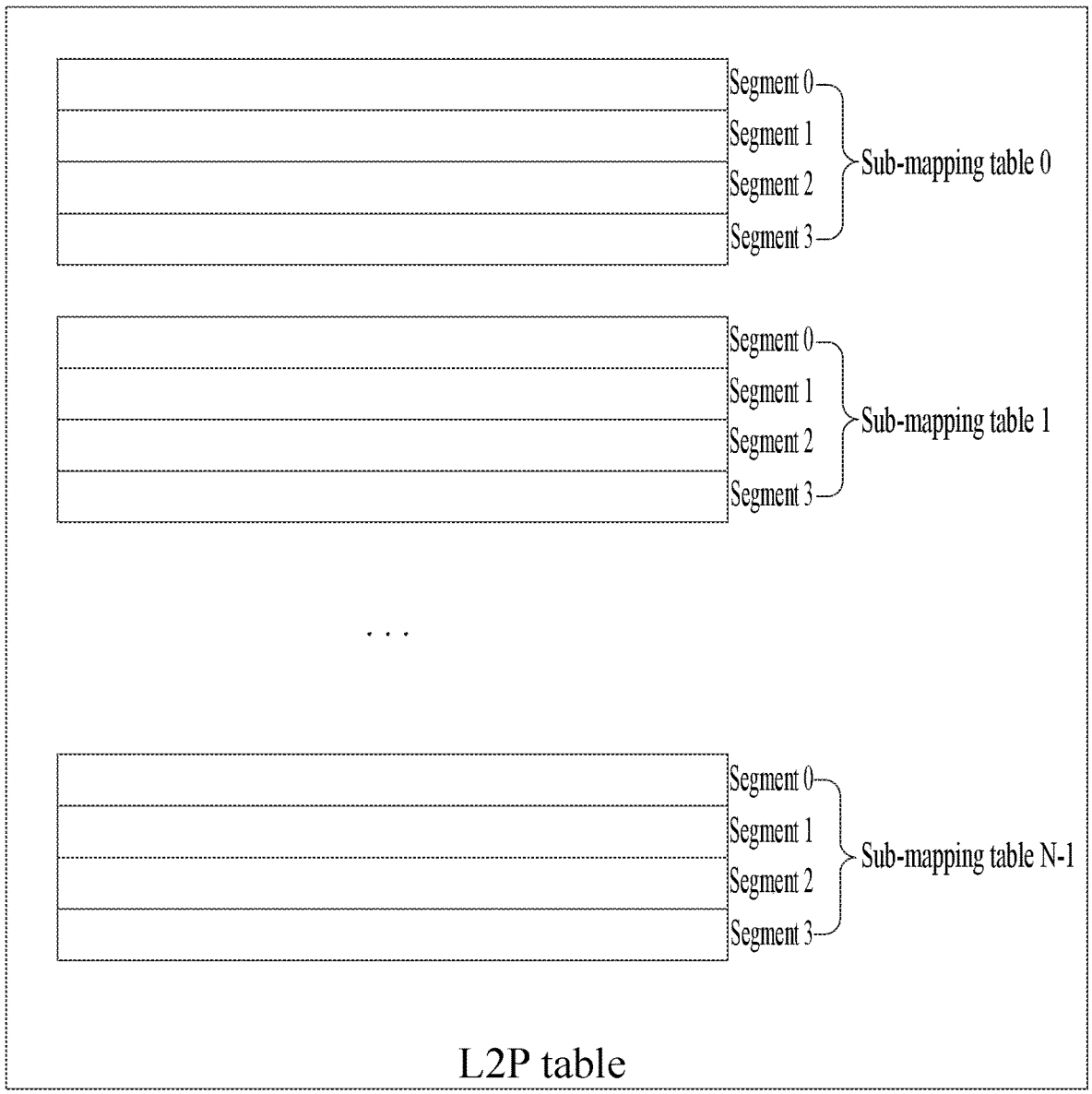

It should be noted that, as shown in FIG. 5b, the L2P table may include a plurality of sub-mapping tables (for example, N sub-mapping tables, where N is greater than or equal to 2), and each sub-mapping table includes a plurality of (for example, 4) segments, each segment is stored with a plurality of physical addresses, and the plurality of target physical addresses to which the plurality of target logical addresses correspond will fall into at least one segment. In the above determining step S101, when the plurality of target physical addresses to which the plurality of target logical addresses correspond fall into a plurality of segments, the acceleration determining circuit 123 of the memory controller 120 will determine whether the address values of the target physical addresses falling in different segments are continuous respectively. For example, the above determining step S101 may specifically include:

based on the currently obtained logical to physical mapping table, determining whether the address values of the plurality of target physical addresses in each segment of the logical to physical mapping table corresponding to the plurality of target logical addresses are continuous.

Specifically, the acceleration determining circuit 123 may perform the above determining step S101 based on whether any several continuous address values of the plurality of target physical addresses differ by 1 in sequence.

Specifically, the size of the sub-mapping table and the segment of the L2P table can be set. In general, it is more conducive for memory controller 120 to perform read operation on the data in the memory devices 110 by setting the size of the sub-mapping table to be larger and the size of the segment to be smaller. For example, the size of each sub-mapping table is 16 KB, and the size of each segment is 1 KB. At this time, each sub-mapping table includes 16 segments, and each segment includes 256 physical addresses.

Further, the address values of the target physical addresses falling in different segments may be continuous or discontinuous. When the address values of the target physical addresses falling in one segment are continuous, the processing unit 121 of the memory controller 120 will compressively store the target physical addresses in this segment. For example, the above setting step S102 may specifically include:

when the address values of the plurality of target physical addresses in one of the segments of the logical to physical mapping table corresponding to the plurality of target logical addresses are continuous, making one target physical address in the one of the segments as the base physical address, and setting the base physical address offset based on the address values of the remaining target physical addresses in the one of the segments.

It should be noted that the memory controller 120 may not sequentially write all the data that needs to be stored to the memory devices 110. For data that is not stored in the sequential write operation mode, the mapping relationships of all the corresponding logical addresses to physical addresses are all loaded into the cache 122 of the memory controller 120. Further, a first cache region and a second cache region can be designed in the cache 122 of the memory controller 120. When the L2P table is loaded into the cache 122, the base physical address and the base physical address offset are stored in the first cache region. The second cache region is used to store the mapping relationship between the plurality of target logical addresses and the plurality of target physical addresses when the address values of the plurality of target physical addresses are not continuous.

Figure 4:
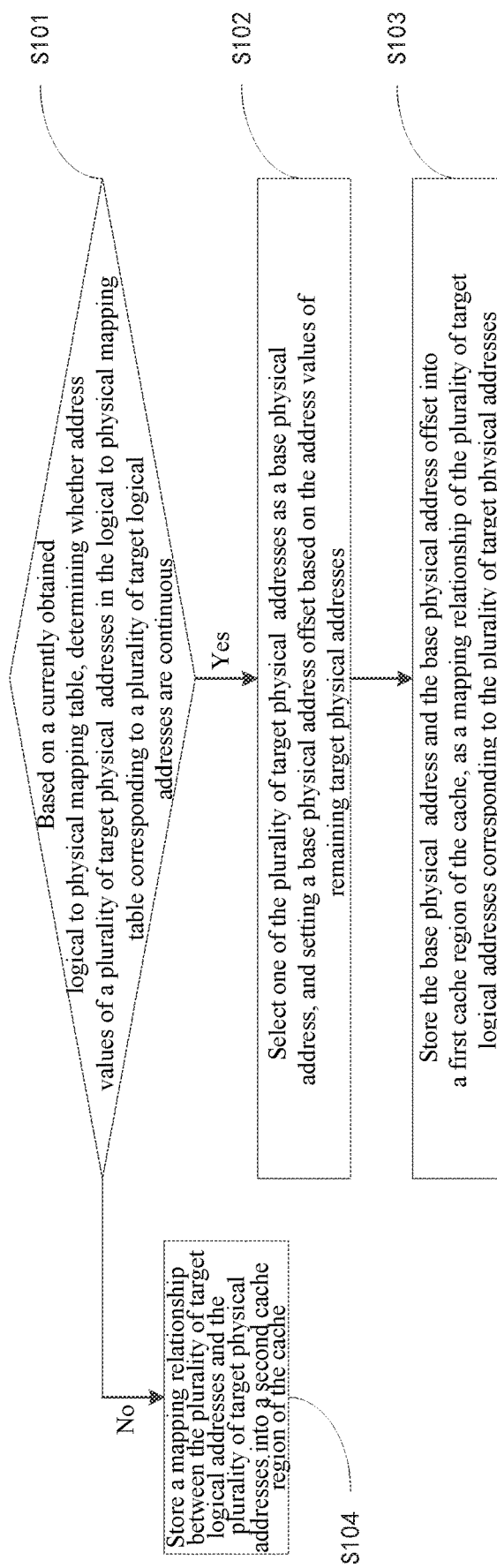
FIG. 4 shows a further schematic flowchart of a method for loading a logical to physical mapping table to a cache of a memory controller provided according to an embodiment of the present disclosure.

Refer specifically to FIG. 4, which shows a further schematic flowchart of a method for loading a logical to physical mapping table to the cache of a memory controller provided according to an embodiment of the present disclosure. As shown in FIG. 4, after the above determining step S101, the method further includes:

ordinarily storing step S104: if not so, storing the mapping relationship between the plurality of target logical addresses and the plurality of target physical addresses into the second cache region of the cache.

Figure 5C:
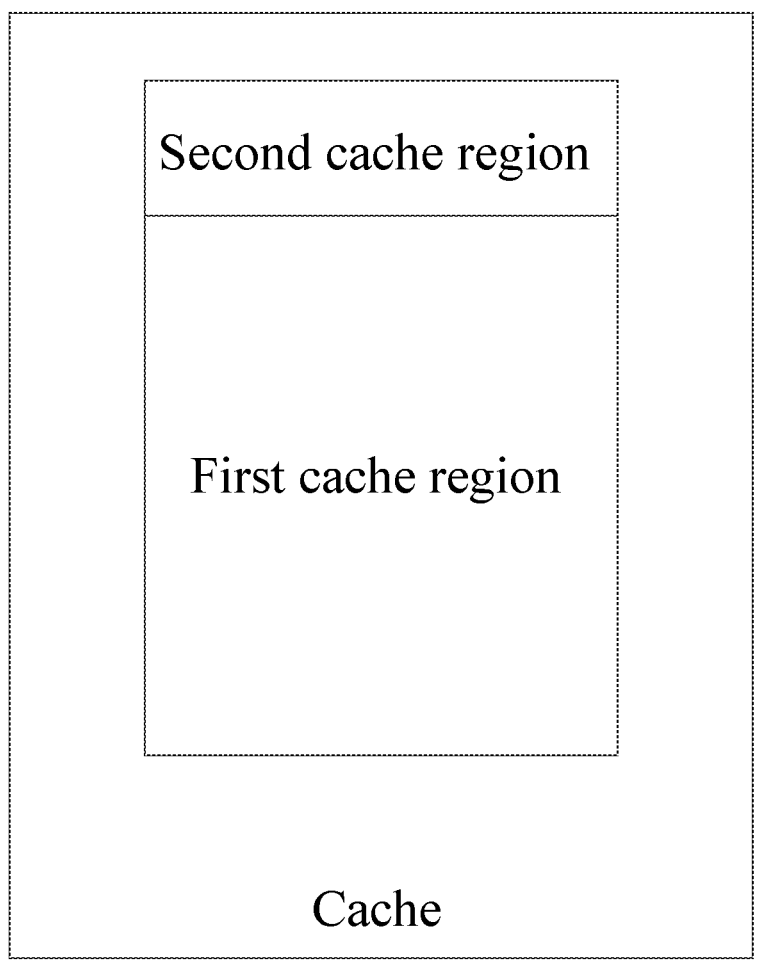

Further, the first cache region may be designed to be larger when there are many cases in which the memory controller 120 executes the sequential write operation mode for the data to be stored in the memory devices 110. For example, the capacity of the first cache region is 80% of the whole capacity of cache 122, as shown in FIG. 5c.

It should be noted that generally, the whole capacity of the cache 122 is 1 MB, with each physical address occupies 4 Byte memory, and each physical address displays one page (in general, one page of data is 4 KB) of user data region. In the general method of loading the L2P table to the cache 122, the cache 122 can display 1 MB/4 Byte*4 KB=1 GB of user data region at most. While in the embodiment of the present disclosure, in that case that the first cache region occupies 80% of the total capacity of the cache 122, and there are 1024 physical addresses in one segment, when all the data is stored in a continuous write way, each physical address displays 1024 pages of user data region, i.e., 4 MB, the first cache region can display 1 MB*80%/4 Byte*4 MB=819.2 GB of user data region at most, which greatly improves the utilization of the cache 122 of the memory controller 120.

The embodiment of the present disclosure provides a method for loading a logical to physical mapping table to the cache of the memory controller, including: based on a currently obtained logical to physical mapping table, determining whether address values of a plurality of target physical addresses in the logical to physical mapping table corresponding to the plurality of target logical addresses are continuous; if so, selecting one of the plurality of target physical addresses as a base physical address, and setting a base physical address offset based on the address values of remaining target physical addresses; then, storing the base physical address and the base physical address offset in the cache, as a mapping relationship of the plurality of target logical addresses corresponding to the plurality of target physical addresses. According to the method provided by the embodiments of the present disclosure, the space of the cache of the memory controller occupied by the L2P table is effectively reduced and the utilization of the cache of the memory controller is improved, since the mapping relationship between the logical addresses to which the data of the plurality of target physical addresses with continuous address values in the memory devices due to sequential write operation mode corresponds and the physical addresses is compressed, and only the base physical address of the plurality of target physical addresses and the base physical address offset set based on address values of the remaining target physical address are stored in the cache.

Figure 6:
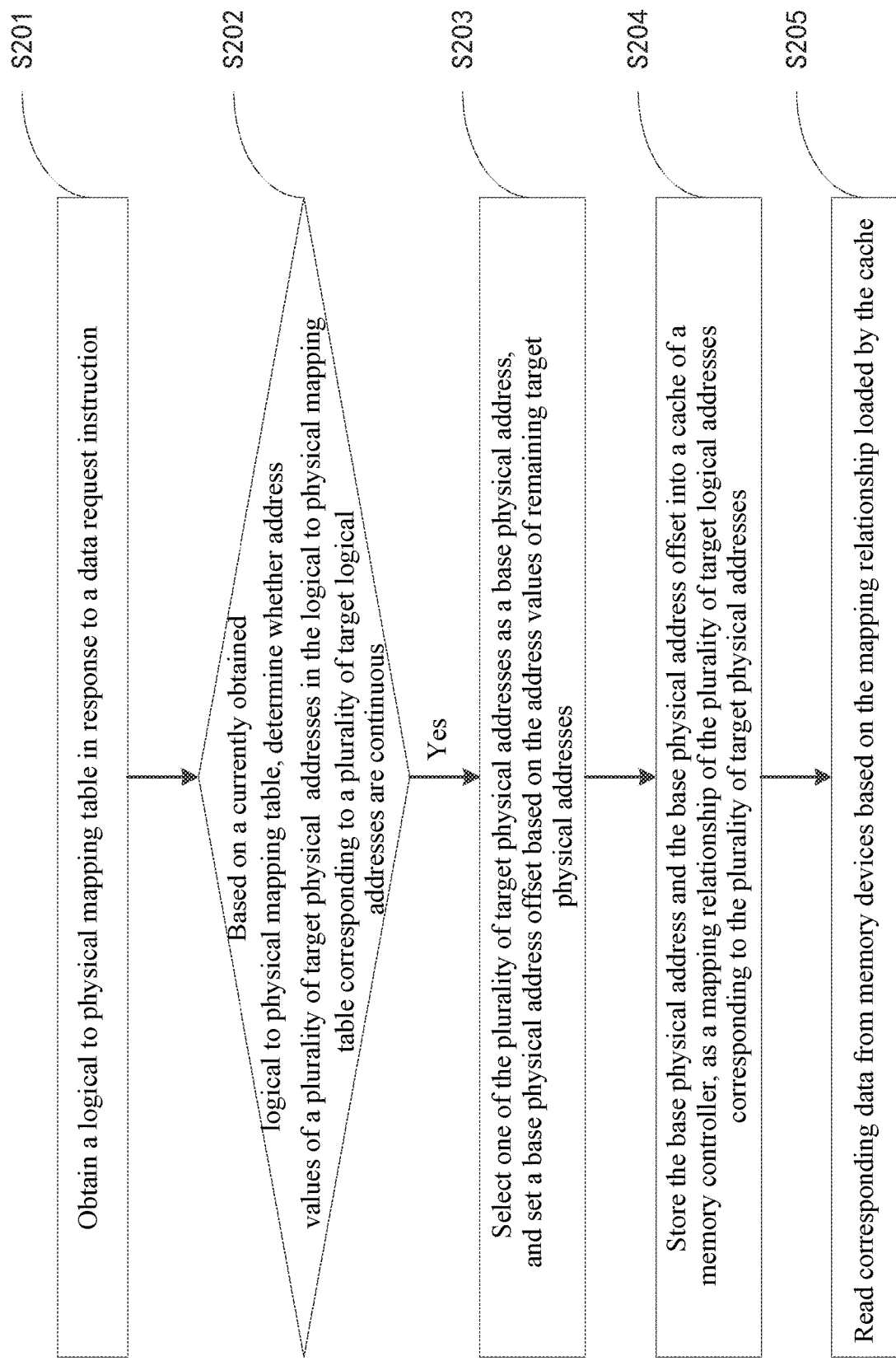
FIG. 6 shows a schematic flowchart of a data operation method of a memory system provided according to an embodiment of the present disclosure.

Refer to FIG. 6, which shows a schematic flowchart of the data operation method of the memory system 100 provided according to an embodiment of the present disclosure. As shown in FIG. 6, the specific flows of the data operation method of the memory system may be as follows: obtaining step S201: obtaining a logical to physical mapping table in response to a data request instruction; determining step S202: based on a currently obtained logical to physical mapping table, determining whether address values of a plurality of target physical addresses in the logical to physical mapping table corresponding to the plurality of target logical addresses are continuous; setting step S203: if so, selecting one of the plurality of target physical addresses as a base physical address, and setting a base physical address offset based on the address values of remaining target physical addresses; storing step S204: storing the base physical address and the base physical address offset in a cache of the memory controller, as a mapping relationship of the plurality of target logical addresses corresponding to the plurality of target physical addresses; reading step S205: reading the corresponding data from the memory devices based on the mapping relationship loaded by the cache.

It should be noted that in the obtaining step S201, the L2P table may be obtained from the storage cell array of the memory devices 110, or may be obtained from the RAM (Random Access Memory) of the host to which the memory system 100 coupled. Further, the data operation method performed on the memory system 100 through the foregoing steps may be a data read operation or a garbage collection operation.

The embodiment of the present disclosure provides a data operation method of a memory system, including: obtaining a logical to physical mapping table in response to a data request instruction; based on a currently obtained logical to physical mapping table, determining whether address values of a plurality of target physical addresses in the logical to physical mapping table corresponding to the plurality of target logical addresses are continuous; if so, selecting one of the plurality of target physical addresses as a base physical address, and setting a base physical address offset based on the address values of remaining target physical addresses; then, storing the base physical address and the base physical address offset in a cache of the memory controller, as a mapping relationship of the plurality of target logical addresses corresponding to the plurality of target physical addresses; and reading the corresponding data from the memory devices based on the mapping relationship loaded by the cache. According to the data operation method provided by the embodiments of the present disclosure, the space of the cache of the memory controller occupied by the L2P table is effectively reduced and the utilization of the cache of the memory controller is improved, since the mapping relationship between the logical addresses to which the data of the plurality of target physical addresses with continuous address values in the memory devices due to sequential write operation mode corresponds and the physical addresses is compressed, and only the base physical address of the plurality of target physical addresses and the base physical address offset set based on address values of the remaining target physical address are stored in the cache.

In addition to the foregoing embodiments, the embodiments of the present disclosure may have other implementations. All technical solutions formed by equal replacements or equivalent replacements fall within the protection scope required by the embodiments of the present disclosure.

In summary, although embodiments of the present disclosure have been disclosed as above, the above embodiments are not intended to limit the embodiments of the present disclosure. Those of ordinary skill in the art can make various modifications and adjustments without departing from the spirit and scope of the embodiments of the present disclosure. Therefore, the protection scope of the embodiments of the present disclosure is subjected to the scope as defined by the claims.

What is claimed is:

1. A data operation method of a memory system, comprising:
 based on an obtained logical to physical mapping table, determining whether address values of a plurality of target physical addresses in the obtained logical to physical mapping table corresponding to a plurality of target logical addresses are continuous;
 if so, selecting one of the plurality of target physical addresses as a base physical address, and setting a base physical address offset based on address values of remaining target physical addresses; and
 storing the base physical address and the base physical address offset into a cache of a memory controller, as a mapping relationship of the plurality of target logical addresses corresponding to the plurality of target physical addresses.

2. The method of claim 1, further comprising:
 storing the base physical address and the base physical address offset into a first cache region of the cache, as the mapping relationship of the plurality of target logical addresses corresponding to the plurality of target physical addresses.

3. The method of claim 2, wherein based on the obtained logical to physical mapping table, determining whether the address values of the plurality of target physical addresses in the obtained logical to physical mapping table corresponding to a plurality of target logical addresses are continuous; and
 if not, storing the mapping relationship between the plurality of target logical addresses and the plurality of target physical addresses into a second cache region of the cache.

4. The method of claim 1, wherein the base physical address is a first or last one of the plurality of target physical addresses.

5. The method of claim 1, wherein an amount of the base physical address offset corresponds to a number of the remaining target physical addresses with continuous address values.

6. The method of claim 1, wherein the obtained logical to physical mapping table includes a plurality of sub-mapping tables, each of the sub-mapping tables includes a plurality of segments, each of the segments is stored with a plurality of physical addresses, and the plurality of target logical addresses correspond to at least one of the segments.

7. The method of claim 6, wherein in response to that the plurality of target logical addresses corresponding to the at least one of the segments, based on the obtained logical to physical mapping table, determining whether the address values of the plurality of target physical addresses in the obtained logical to physical mapping table corresponding to the plurality of target logical addresses are continuous further comprises:
based on the obtained logical to physical mapping table, determining whether the address values of the plurality of target physical addresses in each segment of the obtained logical to physical mapping table corresponding to the plurality of target logical addresses are continuous.

8. The method of claim 7, wherein selecting the one of the plurality of target physical addresses as the base physical address, and setting the base physical address offset based on the address values of the remaining target physical addresses, further comprises:
in response to that the address values of the plurality of target physical addresses in one of the segments of the obtained logical to physical mapping table corresponding to the plurality of target logical addresses are continuous, making one target physical address in the one of the segments as the base physical address, and setting the base physical address offset based on the address values of the remaining target physical addresses in the one of the segments.

9. The method of claim 1, wherein whether the address values of the plurality of target physical addresses in the obtained logical to physical mapping table corresponding to the plurality of target logical addresses are continuous is determined by an acceleration determining circuit.

10. The method of claim 9, wherein the acceleration determining circuit is implemented by adders in a form of hardware.

11. The method of claim 1, wherein based on the obtained logical to physical mapping table, determining whether the address values of the plurality of target physical addresses in the obtained logical to physical mapping table corresponding to the plurality of target logical addresses are continuous is based on whether any several continuous address values of the plurality of target physical addresses differ by 1 in sequence.

12. The method of claim 1, further comprising:
before based on the obtained logical to physical mapping table, determining whether the address values of the plurality of target physical addresses in the obtained logical to physical mapping table corresponding to the plurality of target logical addresses are continuous, obtaining the obtained logical to physical mapping table in response to a data request instruction.

13. The method of claim 1, further comprising:
after storing the base physical address and the base physical address offset into the cache of the memory controller, as the mapping relationship of the plurality of target logical addresses corresponding to the plurality of target physical addresses,
reading corresponding data from memory devices based on the mapping relationship loaded by the cache.

14. A memory controller, comprising:
a processing unit;
a cache corresponding to the processing unit;
an acceleration determining circuit configured to:
based on an obtained logical to physical mapping table, determine whether address values of a plurality of target physical addresses in the obtained logical to physical mapping table corresponding to a plurality of target logical addresses are continuous;
wherein the processing unit is configured to:
obtain, from the acceleration determining circuit, a first instruction indicating that the address values of the plurality of target physical addresses are determined to be continuous;
based on the first instruction, select one of the plurality of target physical addresses as a base physical address, and set a base physical address offset based on address values of remaining target physical addresses; and
store the base physical address and the base physical address offset into the cache, as a mapping relationship of the plurality of target logical addresses corresponding to the plurality of target physical addresses.

15. The memory controller of claim 14, wherein the acceleration determining circuit is implemented by adders in a form of hardware.

16. The memory controller of claim 14, wherein the memory controller is adapted to a sequential write operation mode.

17. The memory controller of claim 14, wherein the cache is a static random access memory.

18. A memory system, comprising:
one or more memory devices; and
a memory controller coupled to the memory devices, wherein the memory controller comprises:
a processing unit;
a cache corresponding to the processing unit;
an acceleration determining circuit configured to:
based on an obtained logical to physical mapping table, determine whether address values of a plurality of target physical addresses in the obtained logical to physical mapping table corresponding to a plurality of target logical addresses are continuous;
wherein the processing unit is configured to:
obtain, from the acceleration determining circuit, a first instruction indicating that the address values of the plurality of target physical addresses are determined to be continuous;
based on the first instruction, select one of the plurality of target physical addresses as a base physical address, and set a base physical address offset based on address values of remaining target physical addresses; and
store the base physical address and the base physical address offset into the cache, as a mapping relationship of the plurality of target logical addresses corresponding to the plurality of target physical addresses.

19. The memory system of claim 18, wherein the memory devices comprise a three-dimensional NAND flash memory.

20. The memory system of claim 18, wherein the obtained logical to physical mapping table is configured to be obtained from a storage cell array of the memory devices, or obtained from a Random Access Memory (RAM) of a host to which the memory system coupled.

\* \* \* \* \*